United States Patent
Kang et al.

(10) Patent No.: US 11,385,526 B2
(45) Date of Patent: Jul. 12, 2022

(54) METHOD OF PROCESSING IMAGE BASED ON ARTIFICIAL INTELLIGENCE AND IMAGE PROCESSING DEVICE PERFORMING THE SAME

(71) Applicant: Samsung Electronics Co., Ltd., Suwon-si (KR)

(72) Inventors: Hansol Kang, Yongin-si (KR); Thomas Byunghak Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 39 days.

(21) Appl. No.: 16/685,402

(22) Filed: Nov. 15, 2019

(65) Prior Publication Data
US 2021/0149274 A1  May 20, 2021

(51) Int. Cl.
| | | |
|---|---|---|
| G03B 13/36 | (2021.01) | |
| H04N 5/232 | (2006.01) | |
| H04N 9/31 | (2006.01) | |
| G06N 3/08 | (2006.01) | |

(52) U.S. Cl.
CPC .............. *G03B 13/36* (2013.01); *G06N 3/08* (2013.01); *H04N 5/232125* (2018.08); *H04N 5/232127* (2018.08); *H04N 5/232933* (2018.08); *H04N 9/3182* (2013.01)

(58) Field of Classification Search
CPC ............. G03B 13/36; H04N 5/232933; H04N 9/3182; H04N 5/232125; H04N 5/232127; G06N 3/08
See application file for complete search history.

(56) References Cited

U.S. PATENT DOCUMENTS

| | | | | |
|---|---|---|---|---|
| 5,749,000 | A * | 5/1998 | Narisawa ................. | G02B 7/28 396/121 |
| 8,207,936 | B2* | 6/2012 | Gustafsson ............. | G10L 21/16 345/156 |
| 9,401,159 | B2 | 7/2016 | Gustafsson et al. | |
| 2016/0073030 | A1* | 3/2016 | Park ................. | H04N 5/232127 348/207.11 |
| 2019/0043172 | A1 | 2/2019 | Chui et al. | |
| 2019/0342490 | A1* | 11/2019 | Kimura ................. | G03B 13/36 |
| 2019/0392831 | A1* | 12/2019 | Pohl ........................ | G06F 40/56 |
| 2020/0145583 | A1* | 5/2020 | Shanmugam ...... | H04N 5/23229 |

FOREIGN PATENT DOCUMENTS

| | | |
|---|---|---|
| JP | 2000-137160 A | 5/2000 |
| JP | 6296833 B2 | 3/2018 |
| KR | 10-2004-0060374 A | 7/2004 |
| KR | 10-1138604 B1 | 4/2012 |
| KR | 10-1968101 B1 | 4/2019 |
| KR | 10-1971967 B1 | 4/2019 |

* cited by examiner

*Primary Examiner* — Luong T Nguyen
(74) *Attorney, Agent, or Firm* — Harness, Dickey & Pierce, P.L.C.

(57) ABSTRACT

In a method of processing an image, a first image including a plurality of objects and image information associated with the first image are obtained. Image processing information associated with an image operation to be performed on the first image is obtained based on an object among the plurality of objects included in the first image and a user command specified in at least one of voice information of a user and touch information from the user. A second image is generated by performing the image operation on the first image based on the image information and the image processing information.

18 Claims, 16 Drawing Sheets

METHOD OF PROCESSING IMAGE BASED ON ARTIFICIAL INTELLIGENCE AND IMAGE PROCESSING DEVICE PERFORMING THE SAME

BACKGROUND

1. Technical Field

Some example embodiments relate generally to image obtaining and processing, and more particularly to methods of processing images based on artificial intelligence (AI), and image processing devices performing the methods.

2. Description of the Related Art

Image recording devices have been adopted in various electronic systems and mobile systems such as, for example, computers, mobile phones, tablets, Virtual Reality (VR) equipments, and robotic systems. An image that is recorded by the image recording device can be processed in various ways. For example, a recorded image can be processed to represent at least one of various effects.

In computer science, artificial intelligence (AI), sometimes called machine intelligence, is intelligence demonstrated by machines, in contrast to the natural intelligence displayed by humans.

In some example embodiments, the AI may be implemented based on a machine learning, a neural network, an artificial neural network (ANN), or the like. The ANN is obtained by engineering a cell structure model of a human brain where a process of efficiently recognizing a pattern is performed. The ANN refers to a calculation model that is based on software or hardware and is designed to imitate biological calculation abilities by applying many artificial neurons interconnected through connection lines. The ANN performs a learning process by interconnecting the artificial neurons having connection intensities. Recently, image operations based on the AI and/or the ANN have been researched.

SUMMARY

Some example embodiment of the present disclosure provides a method of processing an image based on artificial intelligence (AI) capable of efficiently representing various effects on a current image.

Some example embodiment of the present disclosure provides an image processing device performing the method of processing the image.

According to some example embodiments, in a method of processing an image, a first image including a plurality of objects and image information associated with the first image are obtained by processing circuitry. Image processing information associated with an image operation to be performed on the first image is obtained by the processing circuitry based on an object among the plurality of objects and a user command specified in at least one of voice information of a user and touch information from the user. A second image corresponding to the first image is obtained by the processing circuitry by performing the image operation on the first image based on the image information and the image processing information.

According to some example embodiments, an image processing device includes an image pickup device configured to obtain a first image including a plurality of objects and processing circuitry configured to analyze the first image to obtain image information associated with the first image, receive a user command including at least one of voice information of a user and touch information from the user, analyze the user command to obtain image processing information associated with an image operation to be performed on the first image based on an object among the plurality of objects, and obtain a second image by performing the image operation on the first image based on the image information and the image processing information.

According to some example embodiments, in a method of processing an image, a first auto focus is performed by processing circuitry on at least one object of a plurality of objects to obtain a first image including the plurality of objects. The first image is analyzed by the processing circuitry to obtain image information including a scene type of the first image, a plurality of labels representing object types of the plurality of objects, and a plurality of object regions in which the plurality of objects are located in the first image. A user command specified in at least one of voice information of a user and touch information from the user is received by the processing circuitry, the user command representing an image operation to be performed on the first image based on an object among the plurality of objects. The user command is analyzed by the processing circuitry to obtain image processing information including first information associated with the object and second information associated with the image operation. The processing circuitry determines whether a label corresponding to the first information associated with the object among the plurality of labels for the plurality of objects exists. The processing circuitry performs a second auto focus based on the object, the second information associated with the image operation, and determining that the label exists. The processing circuitry performs the image operation on only a first region of the first image that corresponds to the object based on the second information to obtain a second image.

According to some example embodiments, in a method of processing the image based on the artificial intelligence and the image processing device, a current image may be analyzed by processing circuitry based on artificial intelligence to obtain image information, a signal that requires minimal user's operation or interaction may be received by the processing circuitry as a user command, and a desired specific effect may be applied by the processing circuitry to a specific object included in the current image based on the user command and the image information. Thus, the user may issue a user command to the image processing device to focus on the specific object he or she wants, and to selectively and partially apply an appropriate effect on the specific object. Accordingly, various effects may be efficiently expressed or represented on the current image, and user's desire may be satisfied.

BRIEF DESCRIPTION OF THE DRAWINGS

Some example embodiments will be more clearly understood from the following detailed description taken in conjunction with the accompanying drawings.

DETAILED DESCRIPTION

Figure 1:
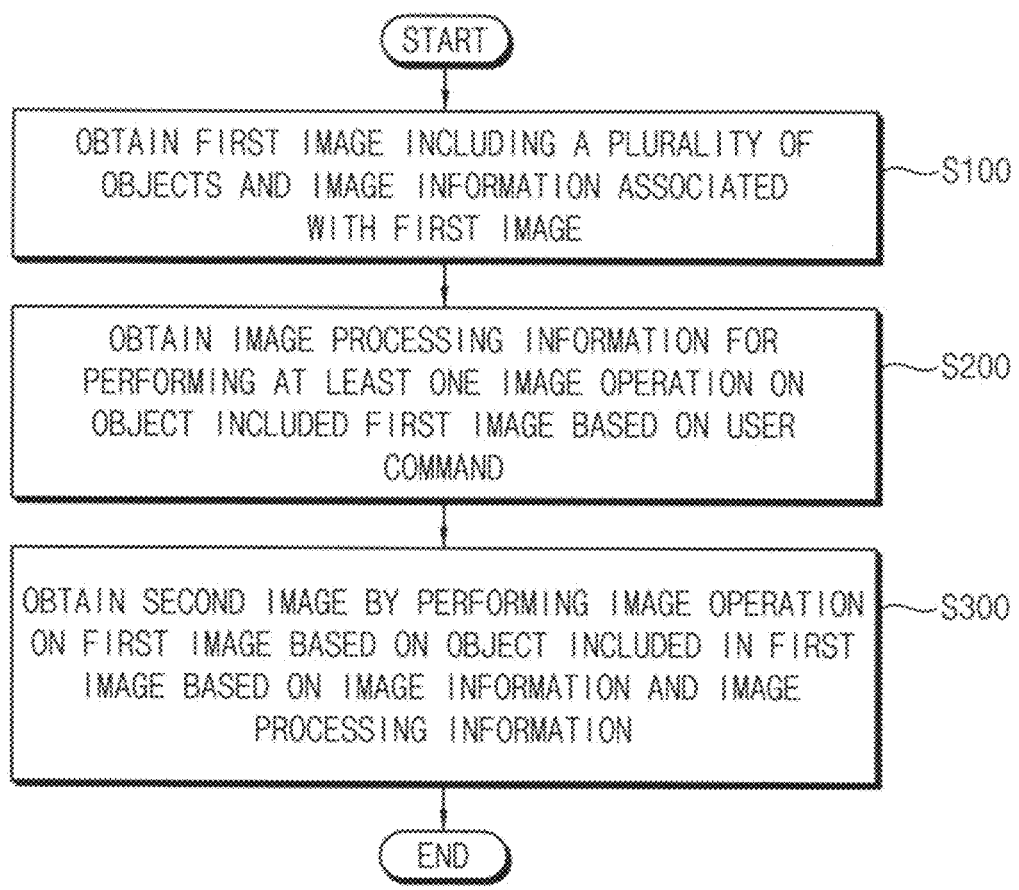
FIG. 1 is a flowchart illustrating a method of processing an image according to some example embodiments.

Various example embodiments will be described more fully with reference to the accompanying drawings, in which some example embodiments are shown. The present disclosure may, however, be embodied in many different forms and should not be construed as limited to the example embodiments set forth herein. Like reference numerals refer to like elements throughout this application.

FIG. 1 is a flowchart illustrating a method of processing an image according to some example embodiments.

Referring to FIG. 1, a method of processing an image according to some example embodiments is performed to apply a desired specific effect to a specific object in the image. In some example embodiments, the method of processing the image may be performed by an image processing device including processing circuitry that analyzes the image based on artificial intelligence (AI). Detailed configurations of the image processing device will be described with reference to FIG. 2 and other figures.

In the method of processing the image according to some example embodiments, a first image including a plurality of objects and image information associated with the first image are obtained by the processing circuitry (operation S100). For example, as will be described with reference to FIG. 4, the first image may be captured by the processing circuitry by performing a first auto focus (AF), and the image information may be obtained by the processing circuitry by analyzing the first image.

Image processing information is obtained by the processing circuitry in response to receiving a user command including at least one of voice information of a user and touch information from the user (operation S200). The image processing information is information for performing an image operation on an object among the plurality of objects included in the first image. For example, the user command may include first information associated with the object and second information associated with the image operation. As will be described with reference to FIG. 6, the image processing information including the first information and the second information may be obtained by the processing circuitry by analyzing the user command. In some example embodiments, the user command may include two or more image operations, such as a focus operation and a sharpen operation with respect to an object, or a focus operation with respect to a first object and a sharpen operation with respect to a second object.

A second image corresponding to the first image is generated by the processing circuitry by performing the image operation on the first image based on the image information and the image processing information obtained by the user command (operation S300). For example, as will be described with reference to FIG. 7, the second image may be generated (e.g., captured) by the processing circuitry by performing a second auto focus based on the object. In some example embodiments, a second image or other subsequent image may be generated by applying a hardware auto focus, such as refocusing the lens on the object and capturing an additional image. In some other example embodiments, the second or other subsequent image may be generated by applying a focusing operation to the first image to refocus (e.g., sharpen) the portion of the image object depicting the object. In other words, the auto focus may be performed twice in the method of processing the image according to some example embodiments. In some example embodiments, as will be described with reference to FIG. 8, the second image may be generated by the processing circuitry by performing the second auto focus and an additional image operation on the image based on the object.

In some example methods of processing the image according to some example embodiments, a current image may be analyzed by the processing circuitry based on artificial intelligence to obtain image information, a signal may be received as a user command, and a desired specific effect may be applied by the processing circuitry to the current image based on a specific object included in the current image based on the user command and the obtained image information. Thus, the user may command the imaging device to focus on the specific object he or she wants, and to selectively and partially apply an appropriate effect on the specific object. Accordingly, various effects may be efficiently expressed or represented on the current image, and user's desire may be satisfied.

Figure 2:
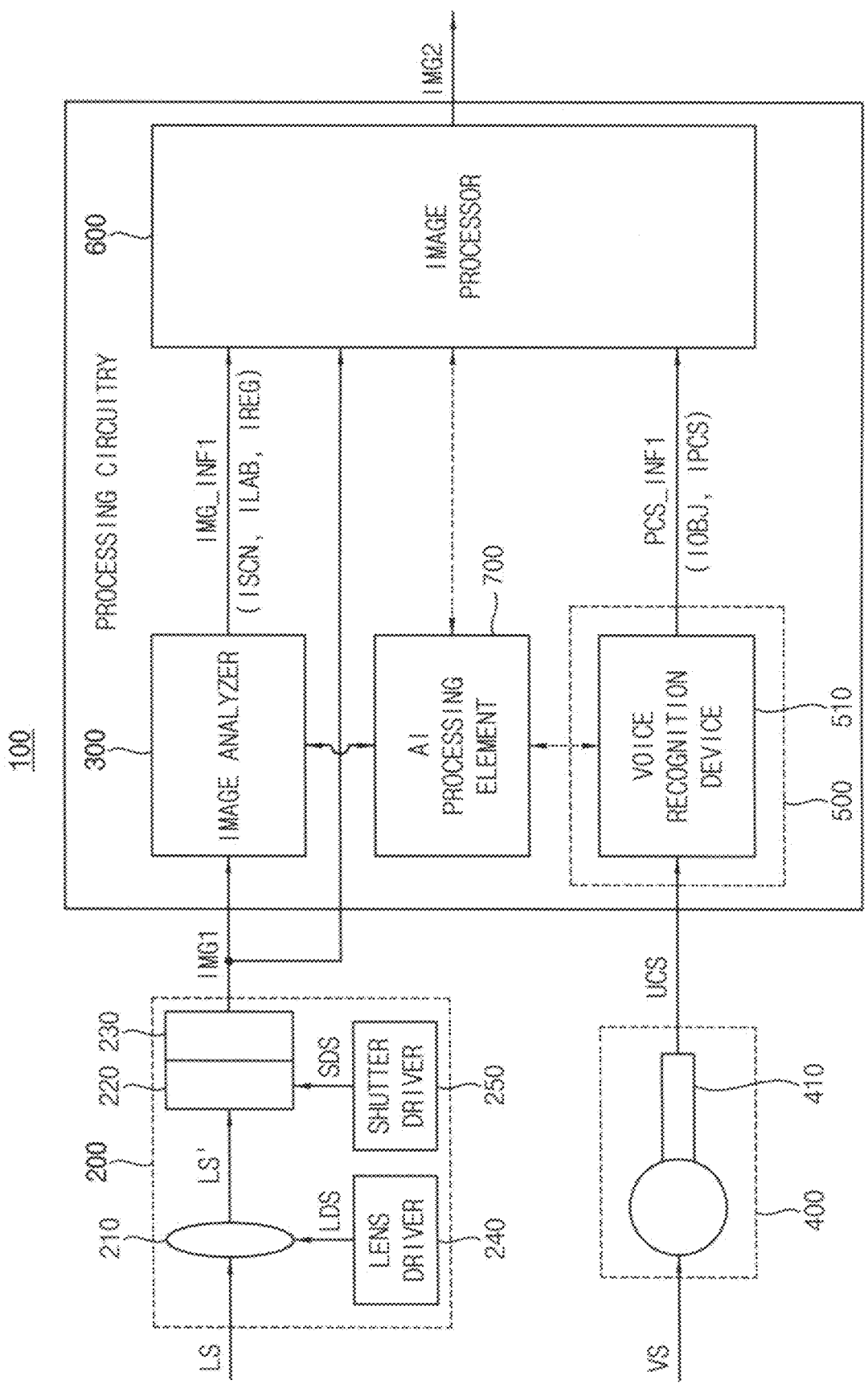
FIG. 2 is a block diagram illustrating an image processing device according to some example embodiments.

FIG. 2 is a block diagram illustrating an image processing device according to some example embodiments.

Referring to FIG. 2, an image processing device 100 includes an image pickup device 200 and processing circuitry. In some example embodiment and as shown in FIG. 2, the processing circuitry may include an image analyzer 300, a command receiver 400, a command analyzer 500 and an image processor 600. The image processing device 100 may further include at least one artificial intelligence processing element (PE) 700. It is to be appreciated that some other example embodiments may include a different set of components than that shown in FIG. 2, such as more or fewer components, and/or a different arrangement of the operations performed by the image processing device 100 and the components that perform such operations. For example, in some example embodiments, one component of the image processing device 100 may perform two or more operations; and in some other example embodiments, one operation may be performed by two or more components. Further, respective components of the processing circuitry may be implemented as a variety of computing technologies, such as hardware, software, or a hardware/software combination.

The image pickup device 200 is configured to receives an external light signal LS reflected from a plurality of objects from the outside and obtains a first image IMG1 corresponding to the external light signal LS. The image pickup device

200 may include at least one of a lens 210, a shutter 220, a sensor 230, a lens driver 240 and a shutter driver 250.

The lens 210 may concentrate the external light signal LS on the sensor 230. For example, the external light signal LS may include a visible light signal, an infrared light signal and/or a near-infrared light signal. Although the image pickup device 200 in FIG. 2 includes a single lens 210, the image pickup device may include two lenses or more than two lenses according to some other example embodiments.

The sensor 230 may obtain the first image IMG1 based on a light signal LS' concentrated through the lens 210. The first image IMG1 may be the first image obtained in operation S100 of FIG. 1, and may be an image on which the first auto focus is performed.

In some example embodiments, the sensor 230 may include a complementary metal oxide semiconductor (CMOS) image sensor. For example, the sensor 230 may include an RGB sensor. In some other example embodiments, the sensor 230 may include one of various types of image sensors, such as a charged coupled device (CCD) image sensor.

The shutter 220 may selectively provide the light signal LS' concentrated through the lens 210 to the sensor 230. For example, the shutter 220 may include one or more of an electrical shutter, an optical shutter, a mechanical shutter, or the like. In some example embodiments, the shutter 220 may be integrated with the sensor 230. In some other example embodiments, the shutter 220 may be separate from the sensor 230.

The lens driver 240 may be configured to generate a lens driving signal LDS for controlling and/or adjusting a position of the lens 210. For example, the lens driver 240 may include one of various types of motors, such as a voice coil motor (VCM). The shutter driver 250 may be configured to generate a shutter driving signal SDS for controlling and/or adjusting a switching time of the shutter 220 (e.g., a time point of opening or closing a shutter) and/or an exposure time of the shutter 220 (e.g., an integration period of a shutter). Although not illustrated in FIG. 2, the image pickup device 200 may further include a controller that is configured to control operations of the lens driver 240 and the shutter driver 250.

The image analyzer 300 may be configured to analyze the first image IMG1 to obtain image information IMG_INF1 associated with the first image IMG1. As will be described with reference to FIG. 4, the image information IMG_INF1 may include information ISCN associated with a scene type of the first image IMG1, information ILAB associated with a plurality of labels for the plurality of objects included in the first image IMG1, information IREG associated with a plurality of object regions in which the plurality of objects are located in the first image IMG1, and the like. Although not illustrated in FIG. 2, the image analyzer 300 may include a scene detector and/or a semantic segmentation unit.

The command receiver 400 may be configured to receive and output a user command signal UCS including at least one of voice information of a user and touch information from the user. The command analyzer 500 may be configured to analyze the user command signal UCS to obtain image processing information PCS_INF1 for performing an image operation on an object among the plurality of objects included in the first image IMG1. As will be described with reference to FIG. 6, the image processing information PCS_INF1 may include first information IOBJ associated with the object, second information IPCS associated with the image operation, and the like.

In an example of FIG. 2, the user command signal UCS may correspond to the voice information of the user. The command receiver 400 may include a voice receiving device 410 that is configured to receive a voice signal VS corresponding to the voice information of the user as the user command signal UCS. For example, the voice receiving device 410 may include at least one of various types of microphones, such as an analog microphone, a digital microphone, a Bluetooth microphone, or the like. The command analyzer 500 may include a voice recognition device 510 that is configured to analyze the voice information of the user to obtain the image processing information PCS_INF1. For example, the voice recognition device 510 may be implemented in the form of a voice assistant service, an automatic speech recognition (ASR) service, or the like.

The image processor 600 may be configured to obtain a second image IMG2 corresponding to the first image IMG1 by performing the image operation on the first image based on the object among the plurality of objects included in the first image IMG1 based on the first image IMG1, the image information IMG_INF1 and the image processing information PCS_INF1 obtained by the user command signal UCS. For example, the image operation may include at least one of an auto focus, an auto exposure, a white balance adjustment, a color saturation adjustment, a contrast adjustment, a sharpness adjustment, an image interpolation, a color correction, a gamma correction and a color conversion.

The artificial intelligence processing element 700 may be interoperable with the image analyzer 300, and may be configured to drive an artificial neural network (ANN) that is configured (e.g., designed and/or trained) to analyze the first image IMG1 to obtain image information IMG_INF1 Example structures of the artificial neural network will be described with reference to FIGS. 3A and 3B.

In some example embodiments, the artificial intelligence processing element 700 may include at least one of a central processing unit (CPU), a graphic processing unit (GPU), a neural processing unit (NPU), a digital signal processor (DSP), an image signal processor (ISP) and a dedicated hardware (DHW). For example, the dedicated hardware may include a vision processing unit (VPU), a vision intellectual property (VIP), and the like. Each processing element may be referred to as a computing resource.

The image pickup device 200, the image analyzer 300 and the artificial intelligence processing element 700 may be collectively referred to as an artificial intelligence camera.

In some example embodiments, the artificial neural network may be interoperable with the voice recognition device 510 included in the command analyzer 500, and may be configured to obtain the image processing information PCS_INF1 by analyzing the voice information of the user. In some other example embodiments, the artificial neural network may be interoperable with the image processor 600, and may be configured to perform the image operation.

In some example embodiments, at least a part of the image analyzer 300, the command analyzer 500, the image processor 600 and the artificial intelligence processing element 700 in FIG. 2 may be implemented as hardware. For example, at least a part of the elements included in the image processing device 100 according to some example embodiments may be included in a computer-based electronic system. In some other example embodiments, at least a part of the image analyzer 300, the command analyzer 500, the image processor 600 and the artificial intelligence processing element 700 in FIG. 2 may be implemented as instruction codes or program routines (e.g., a software program). For example, the instruction codes or the program routines may be executed by a computer-based electronic system, and may be stored in any storage device located inside or outside the computer-based electronic system.

In some example embodiments, the image processing device 100 may be a mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc. In some other example embodiments, the image processing device 100 may be any computing system, such as a personal computer (PC), a server computer, a workstation, a digital television, a set-top box, a navigation system, etc.

Although not illustrated in FIG. 2, the image processing device 100 may further include a memory or a storage that stores data associated with the image processing.

The method of processing the image of FIG. 1 according to some example embodiments may be performed by the image processing device 100. For example, operation S100 in FIG. 1 may be performed by the image pickup device 200 and/or the processing circuitry, including the image analyzer 300 and/or the artificial intelligence processing element 700. Operation S200 in FIG. 1 may be performed by the command receiver 400 and the command analyzer 500, and operation S300 in FIG. 1 may be performed by the image pickup device 200 and the image processor 600.

Figure 3A:
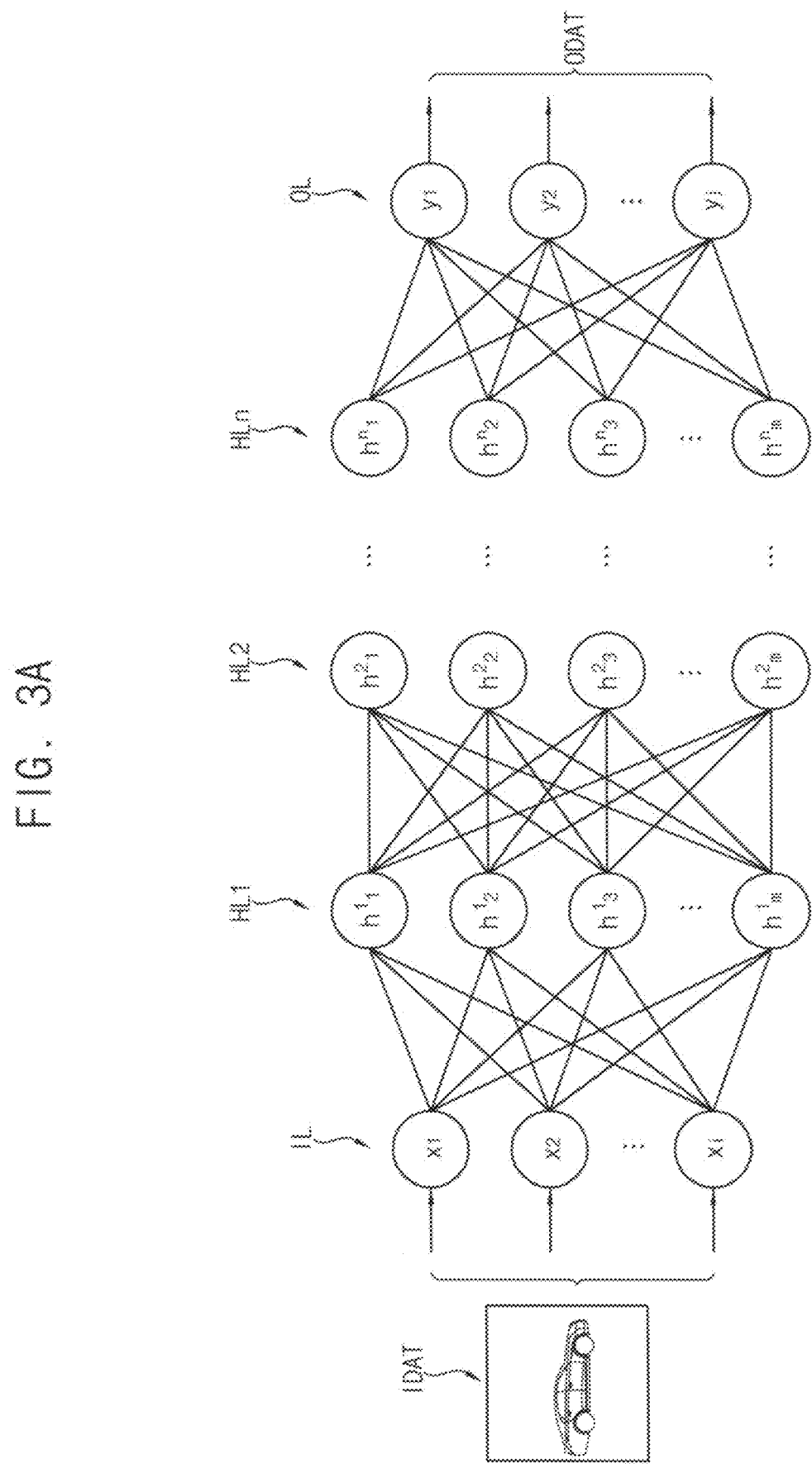
FIGS. 3A and 3B are diagrams for describing examples of an artificial neural network that is driven by an artificial intelligence processing element included in an image processing device according to some example embodiments.
Figure 3B:
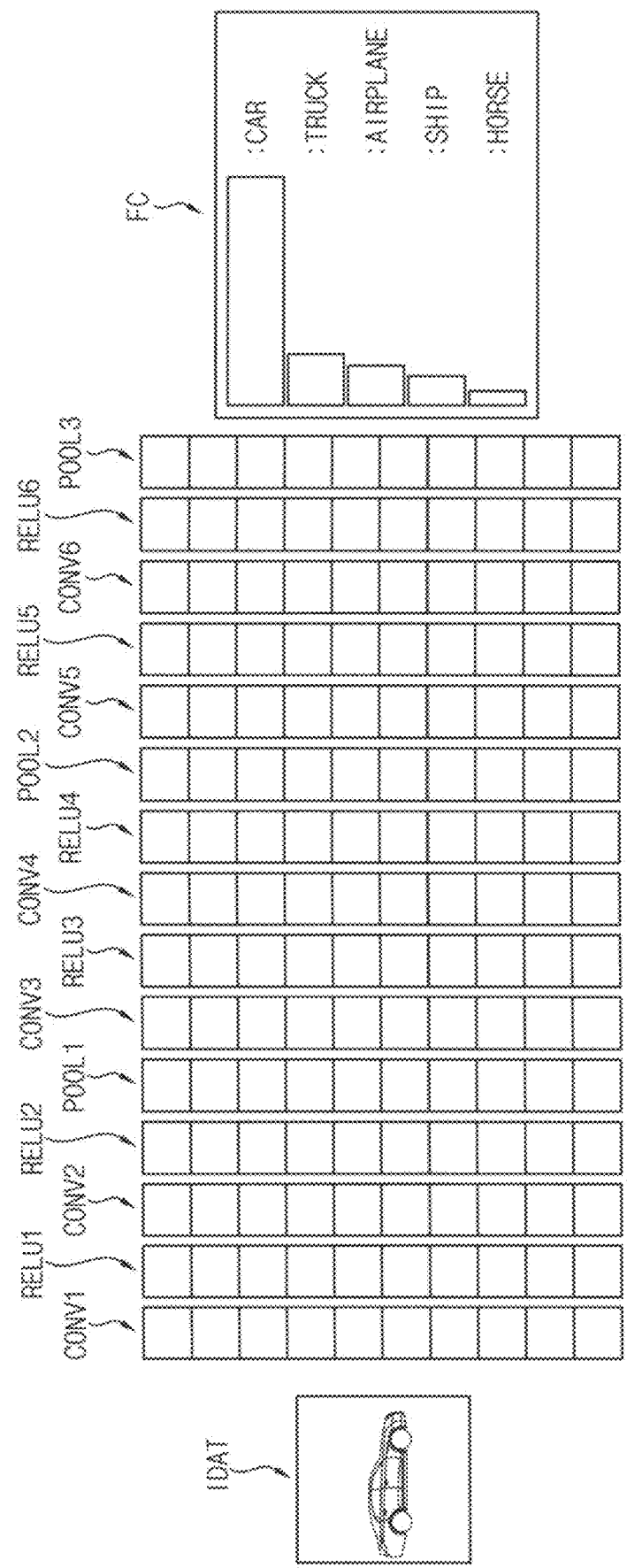

FIGS. 3A and 3B are diagrams for describing examples of an artificial neural network that is driven by an artificial intelligence processing element included in an image processing device according to some example embodiments.

Referring to FIG. 3A, a general neural network may include an input layer IL, a plurality of hidden layers HL1, HL2, ..., HLn and an output layer OL.

The input layer IL may include i input nodes $x_1$, $x_2$, ..., $x_i$, where i is a natural number. Input data (e.g., vector input data) IDAT whose length is i may be input to the input nodes $x_1$, $x_2$, ..., $x_i$ such that each element of the input data IDAT is input to a respective one of the input nodes $x_1$, $x_2$, ..., $x_i$.

The plurality of hidden layers HL1, HL2, ..., HLn may include n hidden layers, where n is a natural number, and may include a plurality of hidden nodes $h^1_1$, $h^1_2$, $h^1_3$, ..., $h^1_m$, $h^2_1$, $h^2_2$, $h^2_3$, ..., $h^2_m$, $h''_1$, $h''_2$, $h''_3$, ..., $h''_m$. For example, the hidden layer HL1 may include m hidden nodes $h^1_1$, $h^1_2$, $h^1_3$, ..., $h^1_m$, the hidden layer HL2 may include m hidden nodes $h^2_1$, $h^2_2$, $h^2_3$, $h^2_m$, and the hidden layer HLn may include m hidden nodes $h''_1$, $h''_2$, $h''_3$, ..., $h''_m$, where m is a natural number.

The output layer OL may include j output nodes $y_1$, $y_2$, ..., $y_j$, where j is a natural number. Each of the output nodes $y_1$, $y_2$, ..., $y_j$ may correspond to a respective one of a plurality of classes to be categorized. The output layer OL may output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 3A may be represented by information on branches (or connections) between nodes illustrated as lines, and a weighted value assigned to each branch, which is not illustrated.

Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function (e.g., a nonlinear function).

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 3A may not be suitable for handling input image data (or input sound data) because each node (e.g., the node $h^1_1$) is connected to all nodes of a previous layer (e.g., the nodes $x_1$, $x_2$, ..., $x_i$ included in the layer IL) and then the number of weighted values drastically increases as the size of the input image data increases. Thus, a convolutional neural network, which is implemented by combining the filtering technique with the general neural network, has been researched such that two-dimensional image (e.g., the input image data) is efficiently trained by the convolutional neural network.

Referring to FIG. 3B, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the convolutional neural network may have three dimensions of width, height and depth, and thus data that is input to each layer may be volume data having three dimensions of width, height and depth. For example, if an input image in FIG. 3B has a size of 32 widths (e.g., 32 pixels) and 32 heights and three color channels R, G and B, input data IDAT corresponding to the input image may have a size of 32*32*3. The input data IDAT in FIG. 3B may be referred to as input volume data or input activation volume.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

In some example embodiments, parameters of each convolutional layer may include a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position.

As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of RELU layers RELU1, RELU2, RELU3, RELU4, RELU5 and RELU6 may perform a rectified linear unit operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOLS may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the convolutional neural network may not be limited to the example described with reference to FIG. 3B and may be changed according to some example embodiments. In addition, although not illustrated in FIG. 3B, the convolutional neural network may further include other layers such as a softmax layer for converting score values corresponding to predicted results into probability values, or a bias adding layer for adding at least one bias.

While FIGS. 3A-3B illustrate the use of an artificial neural network (ANN) to perform some operations, it is to be appreciated that in some example embodiments, the processing circuitry may be configured to perform some operations (including the image operation performed on the first image) artificial intelligence and/or machine learning models that may vary in several respects. As a first example, an artificial neural network that is used by the processing circuitry may be trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). As a second example, the processing circuitry may include (alternatively or additionally to artificial neural networks) other models of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests. It is to be appreciated that all artificial intelligence and/or machine learning models that may be used to perform such operations are included in the present disclosure.

Figure 4:
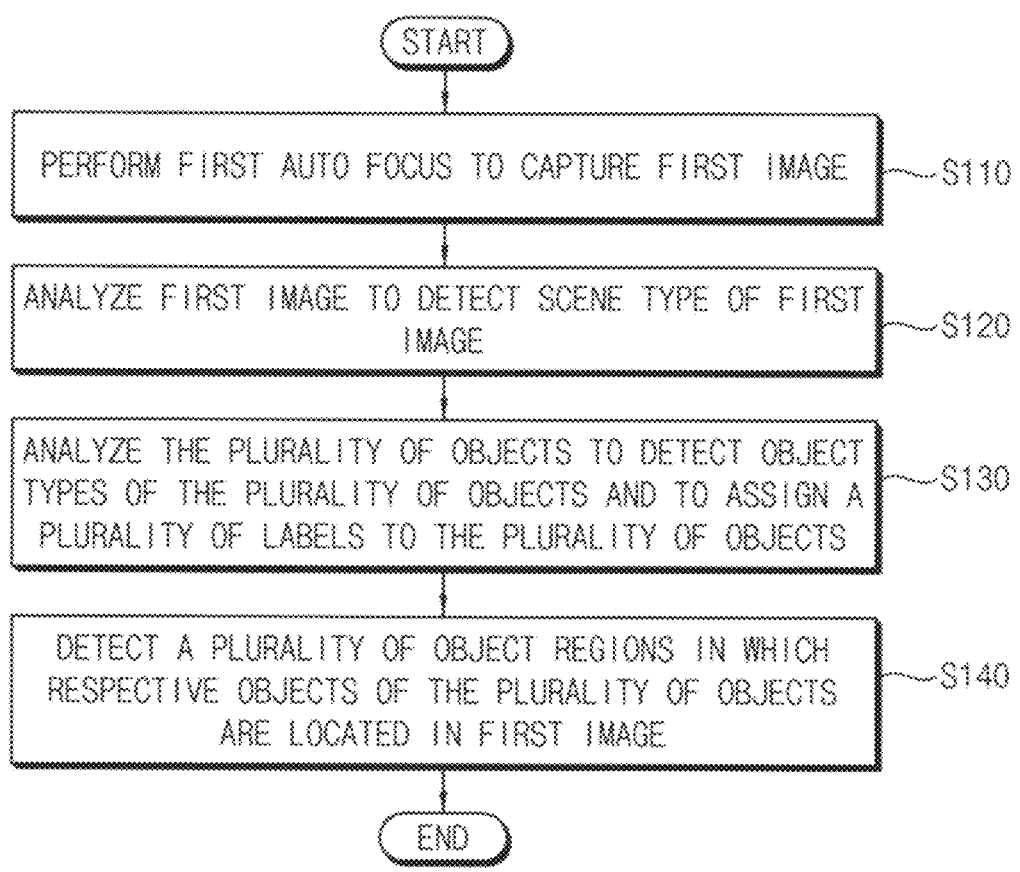
FIG. 4 is a flowchart illustrating an example of obtaining a first image and image information in FIG. 1.
Figure 5:
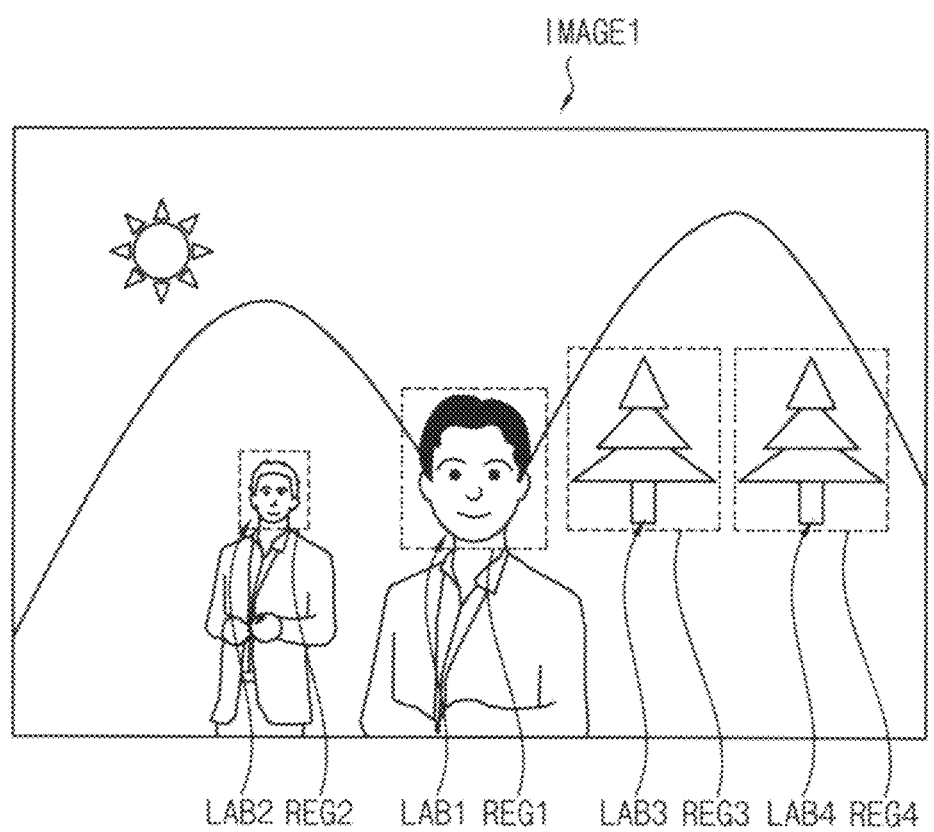
FIG. 5 is a diagram for describing an operation of obtaining the first image and the image information in FIG. 4.

FIG. 4 is a flowchart illustrating an example of obtaining a first image and image information in FIG. 1. FIG. 5 is a diagram for describing an operation of obtaining the first image and the image information in FIG. 4.

Referring to FIGS. 1, 4 and 5, based on obtaining the first image and the image information (operation S100), the processing circuitry of an imaging device may be configured to perform a first auto focus to capture a first image IMAGE1 (operation S110). For example, the first image IMAGE1 of FIG. 5 may include a plurality of objects (e.g., people and trees) and a background (e.g., the sun, mountains, etc.), and the processing circuitry may be configured to perform the first auto focus on at least one object of the plurality of objects.

In some example embodiments, the processing circuitry may be configured to perform the first auto focus on the largest object among the plurality of objects. For example, the processing circuitry may be configured to perform the first auto focus on a person with black hair, which corresponds to the largest object, in the first image IMAGE1 of FIG. 5.

In other example embodiments, the processing circuitry may be configured to perform the first auto focus on an object closest to a center of the first image IMAGE1 among the plurality of objects. For example, the processing circuitry may be configured to perform the first auto focus on a person with black hair, which corresponds to the object closest to the center, in the first image IMAGE1 of FIG. 5.

In still other example embodiments, the processing circuitry may be configured to perform the first auto focus on any fixed region in the first image IMAGE1. For example, the greatest interest region may often be centered in an image, and thus the processing circuitry may be configured to perform the first auto focus on a center region of the first image IMAGE1 of FIG. 5.

In some example embodiments, the processing circuitry may be configured to provide the first image IMAGE1 in the form of image data or include encoded data obtained by encoding the image data. For example, the image data may have one of various image formats, such as RGB (Red, Green, Blue), YUV (Luminance-Bandwidth-Chrominance), YCbCr (Luminance, Chroma-Blue, Chroma-Red in digital video), YPbPr (also referred to as "component video" is the analog version of the YCbCr color space), etc. For example, the encoded data may be generated based on one of various coding schemes, such as JPEG (Joint Photographic Experts Group), MPEG (Moving Picture Expert Group), H.264, HEVC (High Efficiency Video Coding), etc.

After obtaining the first image IMAGE1, the processing circuitry may be configured to analyze the first image IMAGE1 to detect a scene type of the first image IMAGE1 (operation S120). For example, the processing circuitry may be configured to classify the scene type in relation to a place or a background where an image is captured, such as a mountain, a sea, a stream, etc. The processing circuitry may be configured to classify the scene type and top store the scene type in advance, for example, when the image processing device that performs the method of processing the image according to some example embodiments is manufactured. For example, by using the artificial neural network that is driven by the artificial intelligence processing element, the processing circuitry may detect the scene type of the first image IMAGE1 as "mountain."

The processing circuitry may be configured to analyze the plurality of objects included in the first image IMAGE1 to detect object types of the plurality of objects and/or to assign a plurality of labels LAB1, LAB2, LAB3 and LAB4 to the plurality of objects (operation S130). For example, the processing circuitry may be configured to classify the object type in relation to an object (or subject) in an image, such as a person (or face), a car, etc. As with the scene type, the processing circuitry may be configured to classify the object type and to store the object type in advance, for example, when the image processing device that performs the method of processing the image according to some example embodiments is manufactured. For example, by using the artificial neural network that is driven by the artificial intelligence processing element, the processing circuitry may detect and/or classify the plurality of objects in the first image IMAGE1 as two people and two trees, and the plurality of labels LAB1, LAB2, LAB3 and LAB4 may be set to "face 1", "face 2", "tree 1" and "tree 2", respectively.

The processing circuitry may be configured to detect a plurality of object regions REG1, REG2, REG3 and REG4 in which the plurality of objects are located or disposed in the first image IMAGE1 (operation S140). For example, the plurality of object regions REG1, REG2, REG3 and REG4 may indicate positions of the plurality of objects to which the plurality of labels LAB1, LAB2, LAB3 and LAB4 are assigned.

Figure 6:
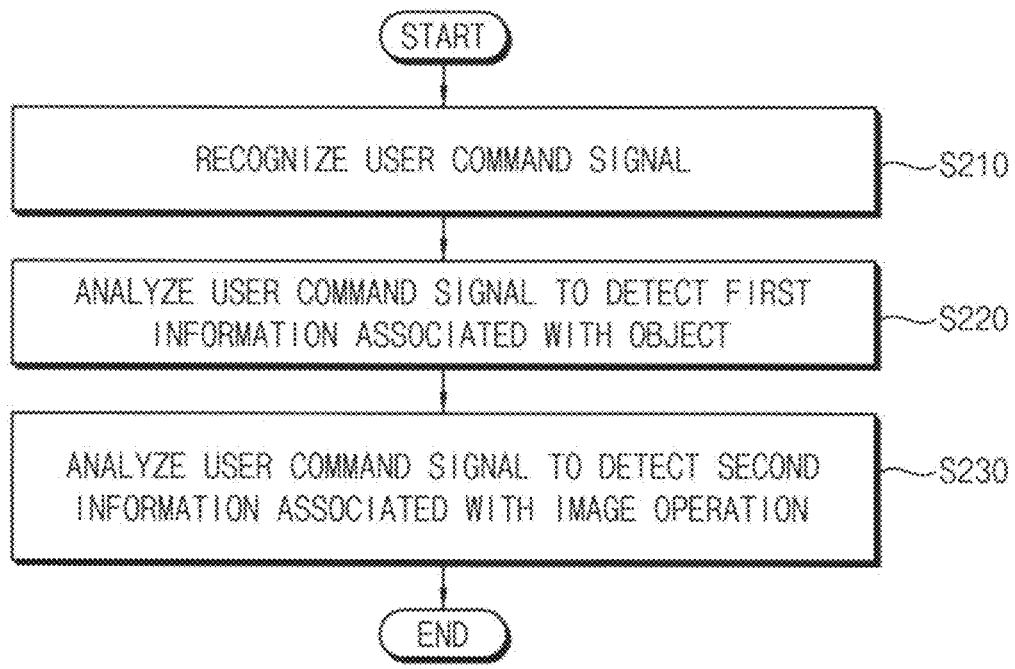
FIG. 6 is a flowchart illustrating an example of obtaining image processing information in FIG. 1.

FIG. 6 is a flowchart illustrating an example of obtaining image processing information in FIG. 1.

Referring to FIGS. 1 and 6, based on the image processing information (operation S200), the processing circuitry may be configured to determine (e.g., recognize) the user command including at least one of the voice information of the user and the touch information from the user (operation S210), to analyze the user command to detect first information associated with the object (operation S220), and/or to analyze the user command to detect second information associated with the image operation (operation S230). In some example embodiments, the voice information and/or the touch information corresponding to the user command may include both the first information associated with the object and the second information associated with the image operation.

For example, based on the voice information being received as the user command, and based on the voice information including a phrase "focus on that face", the processing circuitry may be configured to analyze the voice information to extract "face" as the first information and/or to "focus on" as the second information.

Figure 7:
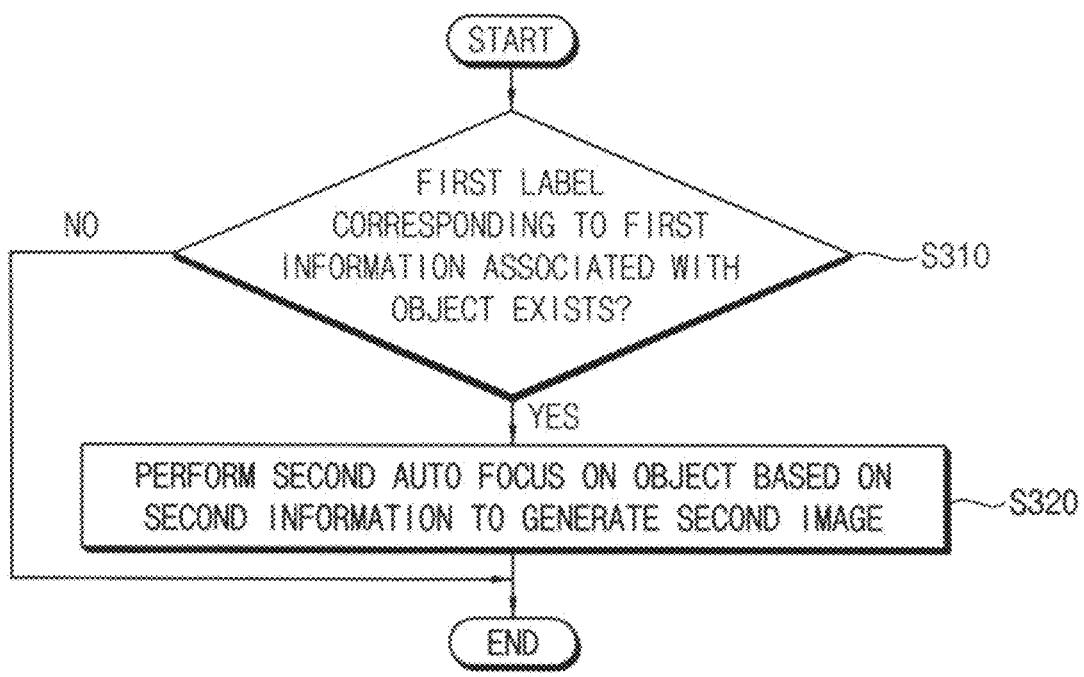
FIG. 7 is a flowchart illustrating an example of obtaining a second image in FIG. 1.
Figure 8A:
FIGS. 8A and 8B are diagrams for describing an operation of obtaining the second image in FIG. 7.
Figure 8B:
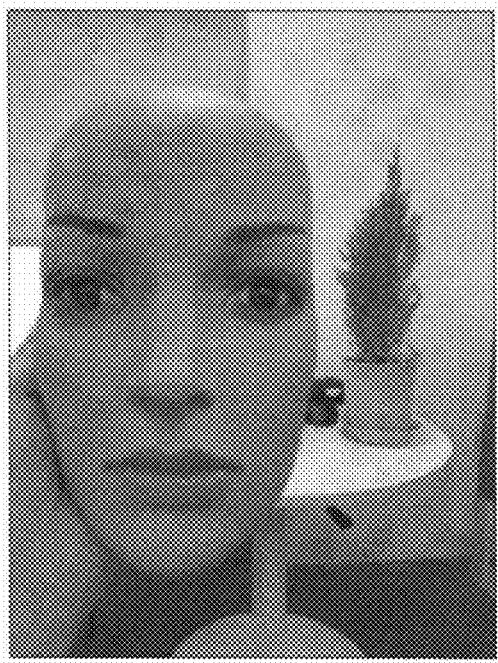

FIG. 7 is a flowchart illustrating an example of obtaining a second image in FIG. 1. FIGS. 8A and 8B are diagrams for describing an operation of obtaining the second image in FIG. 7.

Referring to FIGS. 1, 7, 8A and 8B, based on the second image (operation S300), the processing circuitry may determine a label corresponding to the first information associated with the object among the plurality of labels for the plurality of objects exists (operation S310).

Based on the first label corresponding to the first information being determined to exist (operation S310: YES), the processing circuitry may perform a second auto focus on the image based on the object, the label, and the second information associated with the image operation to generate (e.g., capture) the second image (operation S320).

In an example of FIG. 7, the processing circuitry may be configured to perform the image operation including the second auto focus only on a portion of the image including the object.

In some example embodiments, based on an auto focus being already performed on a portion of the image including the object, e.g., based on the first auto focus in operation S110 of FIG. 4 being performed on the first image based on the object upon which the first image is already focused, the processing circuitry may be configured to omit the second auto focus.

Based on the first label corresponding to the first information not existing (operation S310: NO), the processing circuitry may be configured to terminate the process without any image processing, e.g., without obtaining the second image.

In some example embodiments, an image of FIG. 8A may be the first image, and an image of FIG. 8B may be the second image. For example, the processing circuitry may be configured to capture the image of FIG. 8A including a face and a flower as the first image, and/or to capture the first image by performing the first auto focus on the face. The processing circuitry may be configured to analyze the image of FIG. 8A and objects in the image of FIG. 8A to detect a scene type as "room", to assign labels of "face" and "flower" to the objects, and/or to detect object regions indicating positions of the objects. After that, based on voice information including a phrase "focus on that flower" as the user command, the processing circuitry may be configured to analyze the user command to extract "flower" and "focus on" as the first information and the second information, respectively. Since the label corresponding to the first information "flower" exists, the processing circuitry may be configured to perform the second auto focus on the flower, and the image of FIG. 8B may be generated (e.g., captured) as the second image.

In some other example embodiments, the image of FIG. 8B may be the first image, and the image of FIG. 8A may be the second image. For example, the image of FIG. 8B in which the first auto focus is performed on the flower may be captured as the first image. The processing circuitry may be configured to analyze the image of FIG. 8B and the objects in the image of FIG. 8B to detect the scene type, to assign the labels, and/or to detect the object regions. After that, based on voice information including a phrase "focus on that face" as the user command, the processing circuitry may be configured to analyze the user command to extract "face" and "focus on" as the first information and the second information, respectively. Since the label corresponding to the first information "face" exists, the processing circuitry may be configured to perform the second auto focus on the face, and/or to generate (e.g., capture) the image of FIG. 8A as the second image.

In still other example embodiments, both the image of FIG. 8A and the image of FIG. 8B may be the second image. For example, although not illustrated, the processing circuitry may be configured to capture an image in which the first auto focus is performed on a region other than the face and the flower as the first image. The processing circuitry may be configured to analyze first image and the objects in the first image to detect the scene type, to assign the labels, and/or to detect the object regions. After that, based on the voice information including the phrase "focus on that face" as the user command, the processing circuitry may be configured to generate (e.g., capture) the image of FIG. 8A as the second image according to the above-described process. Based on the voice information including the phrase "focus on that flower" as the user command, the processing circuitry may be configured to generate (e.g., capture) the image of FIG. 8B as the second image according to the above-described process.

Figure 9:
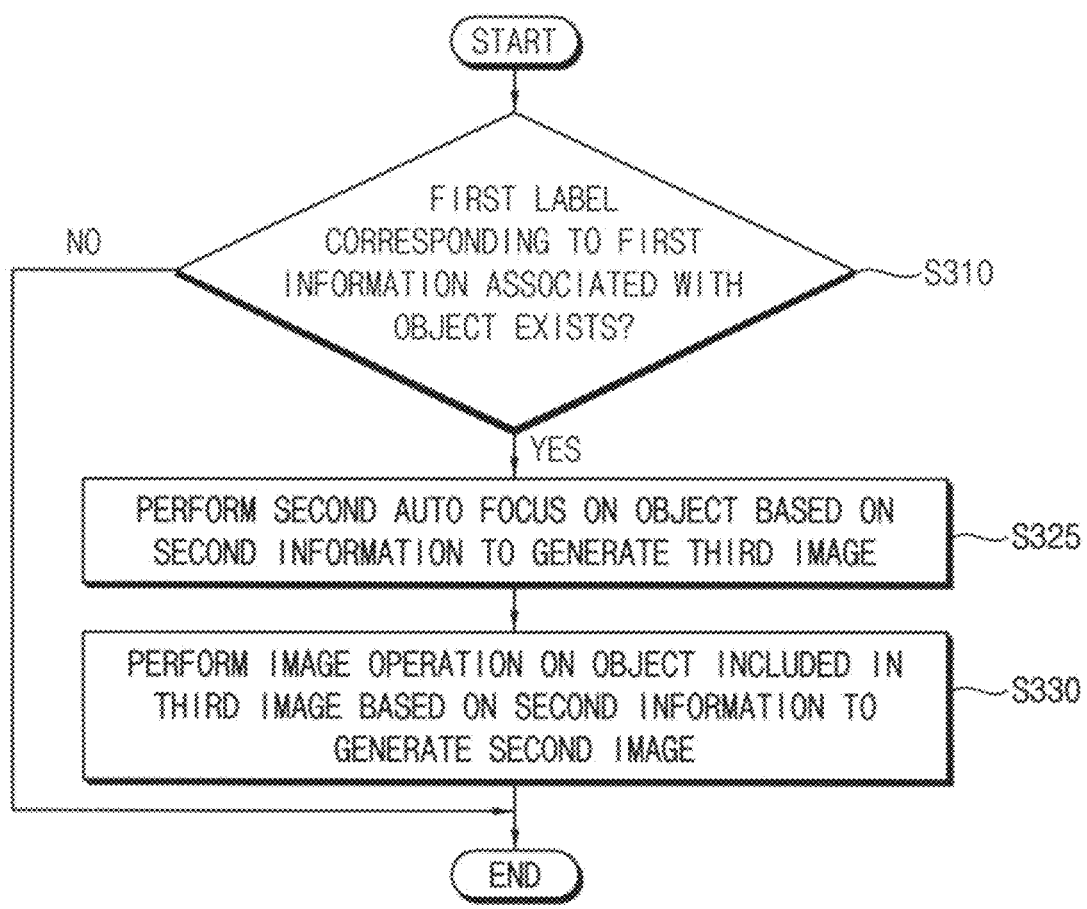
FIG. 9 is a flowchart illustrating another example of obtaining a second image in FIG. 1.

FIG. 9 is a flowchart illustrating another example of obtaining a second image in FIG. 1. FIGS. 10A, 10B, 11A and 11B are diagrams for describing an operation of obtaining the second image in FIG. 9. The descriptions repeated with FIG. 7 will be omitted.

Referring to FIGS. 1, 9, 10A, 10B, 11A and 11B, based on obtaining the second image (operation S300), operation S310 in FIG. 9 may be substantially the same as operation S310 in FIG. 7.

Based on determining that the first label corresponding to the first information exists (operation S310: YES), the processing circuitry may be configured to perform a second auto focus on the first image based on the object and the second information associated with the image operation to generate (e.g., capture) a third image (operation S325), and/or to perform the image operation on the third image based on the object and the second information to generate the second image (operation S330).

In an example of FIG. 9, the image operation may include the second auto focus for the object, and may further include at least one of a white balance adjustment, a color saturation adjustment, a contrast adjustment and a sharpness adjustment for a first region corresponding to the object. However, some example embodiments are not limited thereto, and the image operation may further include an image interpolation, a color correction, a gamma correction, a color conversion, etc., for the first region corresponding to the object.

Based on determining that the first label corresponding to the first information does not exist (operation S310: NO), the processing circuitry may be configured to terminate the process without any image processing, e.g., without obtaining the second image.

Figure 10A:
FIGS. 10A, 10B, 11A and 11B are diagrams for describing an operation of obtaining the second image in FIG. 9.
Figure 10B:
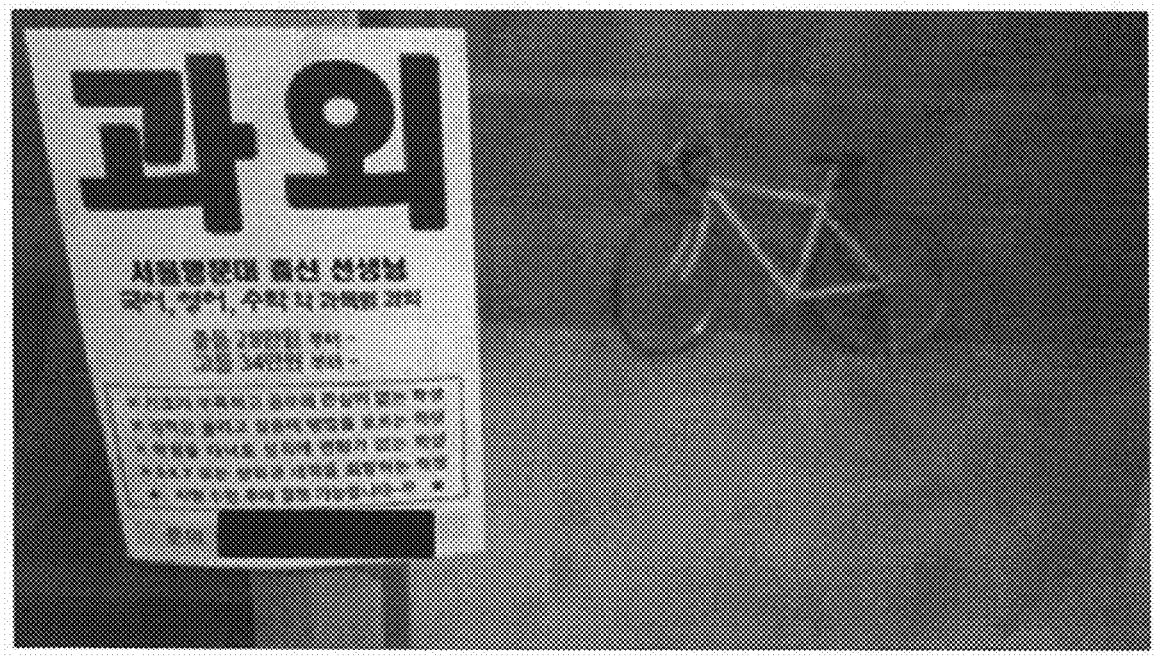

In some example embodiments, an image of FIG. 10A may be the first image, and an image of FIG. 10B may be the second image. For example, the processing circuitry may be configured to capture the image of FIG. 10A including a text and a bicycle as the first image, for example, by performing the first auto focus on the bicycle. The processing circuitry may be configured to analyze the image of FIG. 10A and objects in the image of FIG. 10A to detect a scene type as "street", to assign labels of "text" and "bicycle" to the objects, and/or to detect object regions indicating positions of the objects. After that, based on voice information including a phrase "make the text clear" as the user command, the processing circuitry may be configured to analyze the user command to extract "text" and "make clear" as the first information and the second information, respectively. Based on determining that the label corresponding to the first information "text" exists, the processing circuitry may be configured to perform the second auto focus on a leaflet including the text to generate (e.g., capture) the third image, to increase a sharpness of the third image, and to obtain the image of FIG. 10B as the second image.

Figure 11A:
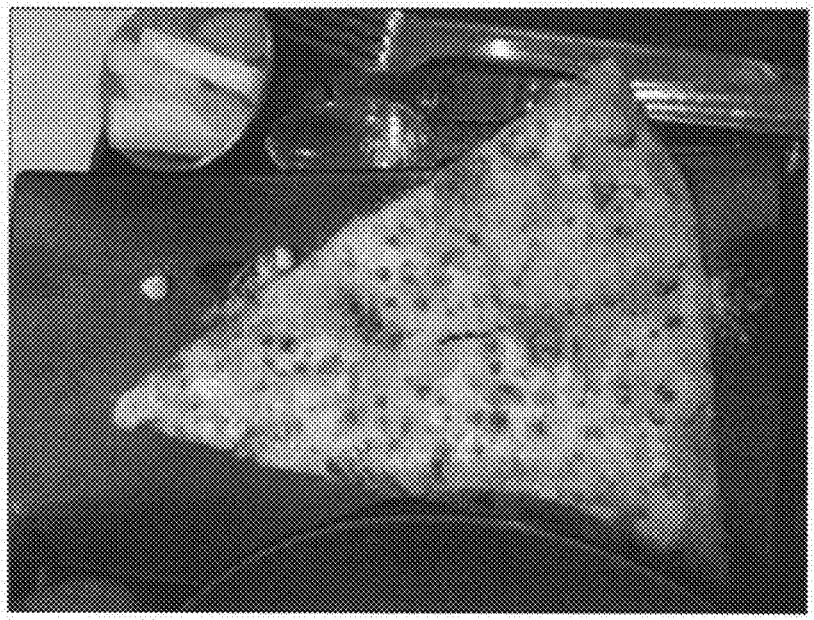
Figure 11B:
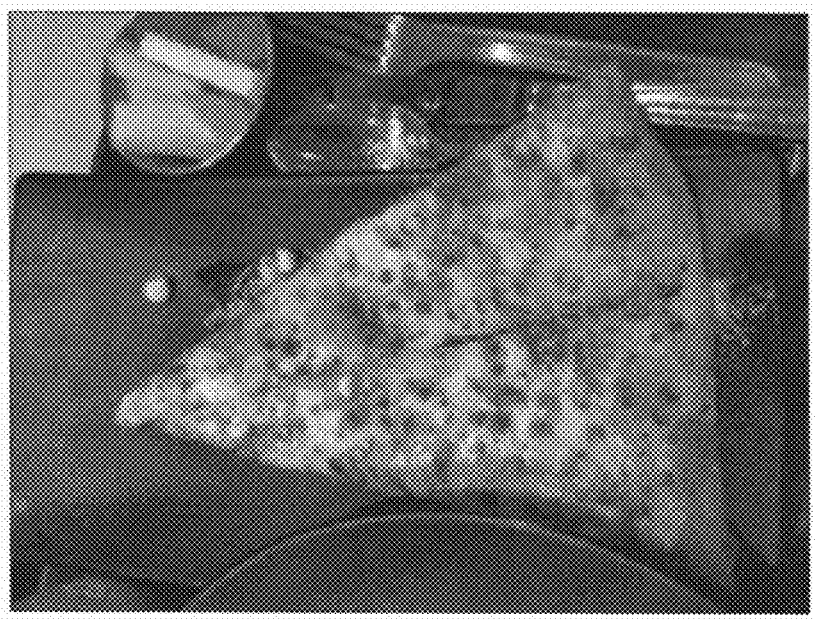

In some example embodiments, an image of FIG. 11A may be the first image, and an image of FIG. 11B may be the second image. For example, the processing circuitry may be configured to capture the image of FIG. 11A including a pizza, a fork, a knife, etc. as the first image, for example, by performing the first auto focus on the pizza. The processing circuitry may be configured to analyze image of FIG. 11A and objects in the image of FIG. 11A to detect a scene type as "restaurant," to assign labels of "pizza," "fork" and "knife" to the objects, and/or to detect object regions indicating positions of the objects. After that, based on voice information including a phrase "make the pizza colorful" as the user command, the processing circuitry may be configured to analyze the user command to extract "pizza" and "make colorful" as the first information and the second information, respectively. Based on determining that the label corresponding to the first information "pizza" exists, the processing circuitry may be configured to perform the second auto focus on the pizza to generate (e.g., capture) the third image, to adjust and/or modify a color saturation and/or contrast of the third image, and/or to obtain the image of FIG. 11B as the second image. Alternatively, since the first auto focus is already performed on the pizza in the first image, the processing circuitry may be configured to omit an operation of capturing the third image, adjusting and/or modifying a color saturation and/or contrast of the first image, and/or obtaining the image of FIG. 11B as the second image.

In some example embodiments, the processing circuitry may be configured to perform the image operation partially, for example, only on a first region corresponding to the object in the third image. However, some example embodiments are not limited thereto, and the processing circuitry may be configured to perform the image operation on the entire (or whole) third image.

Figure 12:
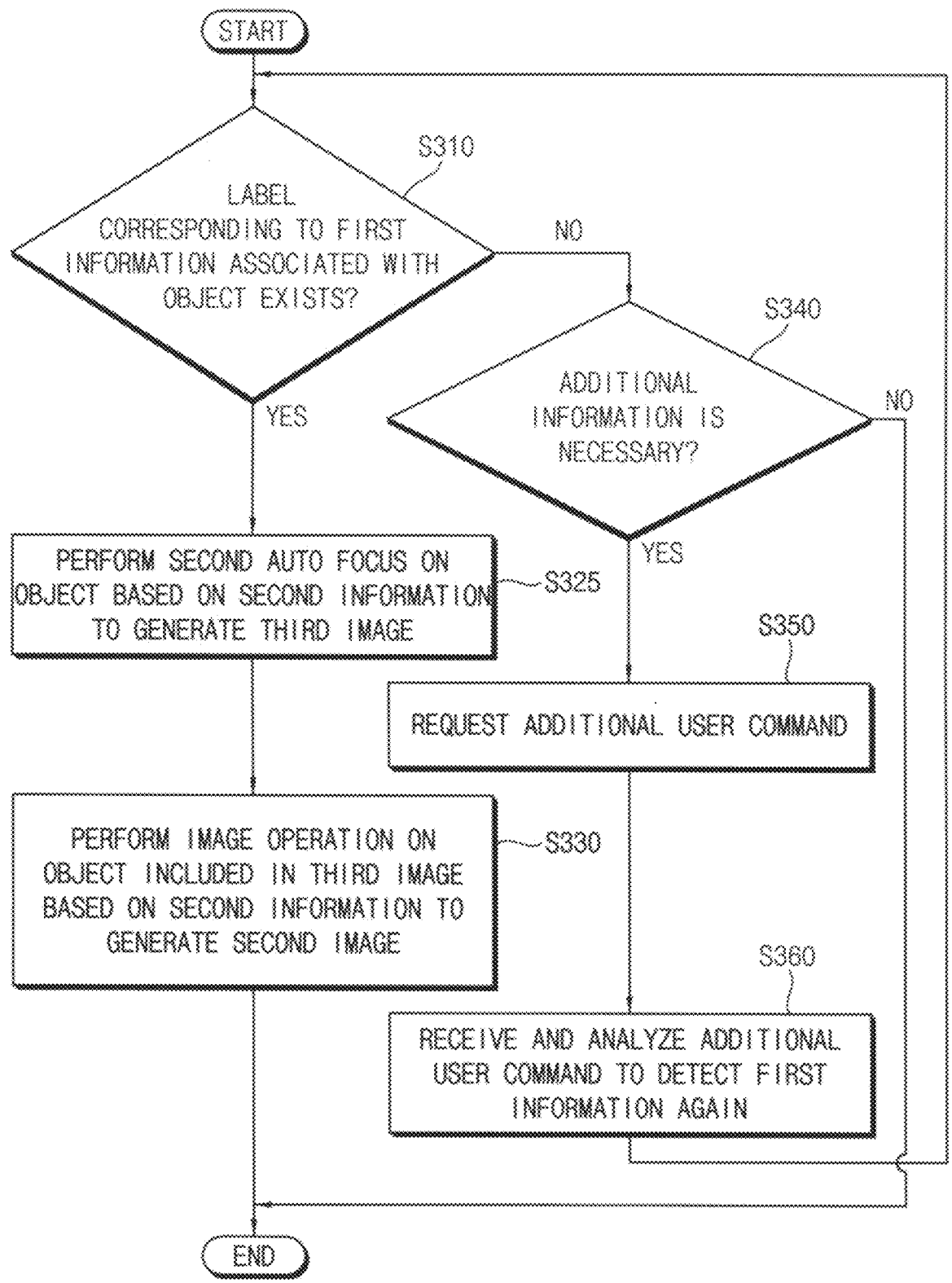
FIG. 12 is a flowchart illustrating still another example of obtaining a second image in FIG. 1.

FIG. 12 is a flowchart illustrating still another example of obtaining a second image in FIG. 1. The descriptions repeated with FIGS. 7 and 9 will be omitted.

Referring to FIGS. 1 and 12, based on the second image (operation S300), operations S310, S325 and S330 in FIG. 12 may be substantially the same as operations S310, S325 and S330 in FIG. 9, respectively.

Based on determining that the first label corresponding to the first information does not exist (operation S310: NO), the processing circuitry may be configured to perform check whether additional information for determining whether the first label exists is necessary (operation S340), instead of terminating the process without obtaining the second image.

Based on determining a need for additional information (operation S340: YES), the processing circuitry may be configured to request an additional user command (operation S350), to receive and/or analyze the additional user command to detect the first information again (operation S360), and/or to perform operations S310, S325 and S330 based on the first information detected from the additional user command. Based on the additional information not being needed (operation S340: NO), the processing circuitry may be configured to terminate the process without any image processing, e.g., without obtaining the second image.

In some example embodiments, the processing circuitry may be configured to request the additional user command only based on determining that the first label corresponding to the first information associated with the object among the plurality of labels for the plurality of objects does not exist. For example, when the image of FIG. 8A may be the first image, and based on the voice information including the phrase "make the text clear" as the user command, the processing circuitry may be configured to request the additional user command, for example, by outputting a message "please select another object" because there is no text in the first image.

In some other example embodiments, the processing circuitry may be configured to request the additional user command based on failing to confirm whether the first label corresponding to the first information associated with the object among the plurality of labels for the plurality of objects exists using only the first information. For example, the image of FIG. 5 may be the first image, and based on the voice information including the phrase "focus on that face" as the user command, the processing circuitry may be configured to request an additional user command by outputting a message "Who's face should focus on?" because it is not clear which of the two faces to focus on.

In some example embodiments, the processing circuitry may be configured to request and/or receive more specific and detailed information in the operation of initially receiving the user command. For example, the image of FIG. 5 may be the first image, and based on voice information including a phrase "focus on the left man's face" as the user command, the processing circuitry may be configured to perform the image operation (e.g., immediately, directly, and/or without requesting an additional user command).

In some example embodiments, the image processing device that performs the method of processing the image according to some example embodiments may further include a depth sensor or a device for predicting a distance from an object, and may be performed an image processing based on distance (or depth) information. For example, based on distances from a camera to objects being different from each other, and based on voice information including a phrase "focus on the closest person" or "focus on the farthest car" as the user command, the processing circuitry may be configured to perform the image operation (e.g., immediately and/or directly) based on the distance information received from the depth sensor or the device for predicting the distance, without requesting the additional user command.

Although not illustrated, the operation of requesting the additional user command illustrated in FIG. 12 may also be applied to the example of FIG. 7.

Although some example embodiments have been described with reference to FIGS. 4 through 12 based on a specific image, a specific object and a specific image processing, some example embodiments are not limited thereto, and may be employed or extended to examples where the processing circuitry may be configured to apply a desired effect selectively and/or partially to any object in an image. In addition, although some example embodiments have been described based on an image including a plurality of objects, some example embodiments are not limited thereto, and may be employed or extended to examples where an image includes a single object.

As will be appreciated by those skilled in the art, some inventive concepts discussed herein may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 13:
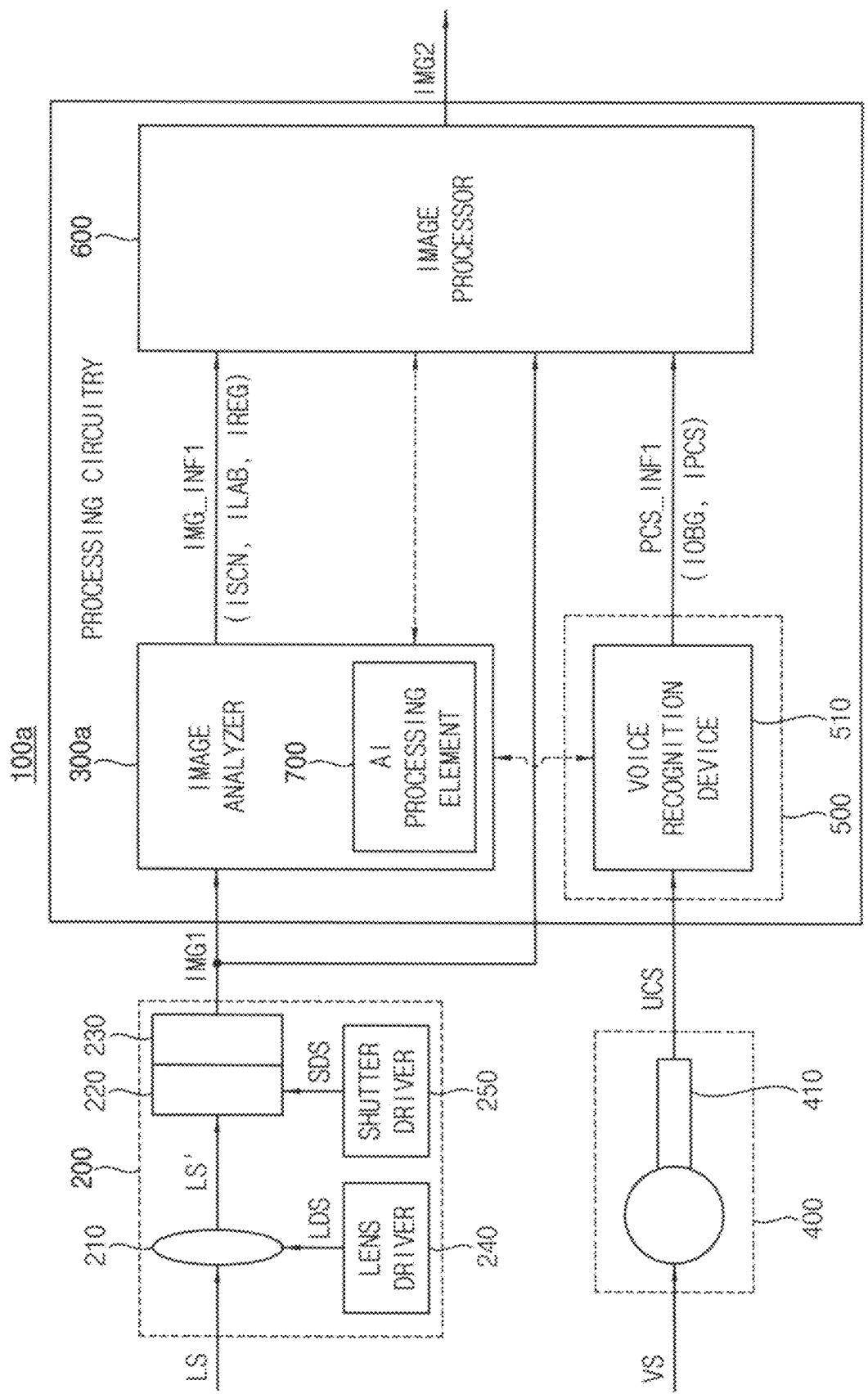
FIGS. 13, 14 and 15 are block diagrams illustrating an image processing device according to some example embodiments.
Figure 14:
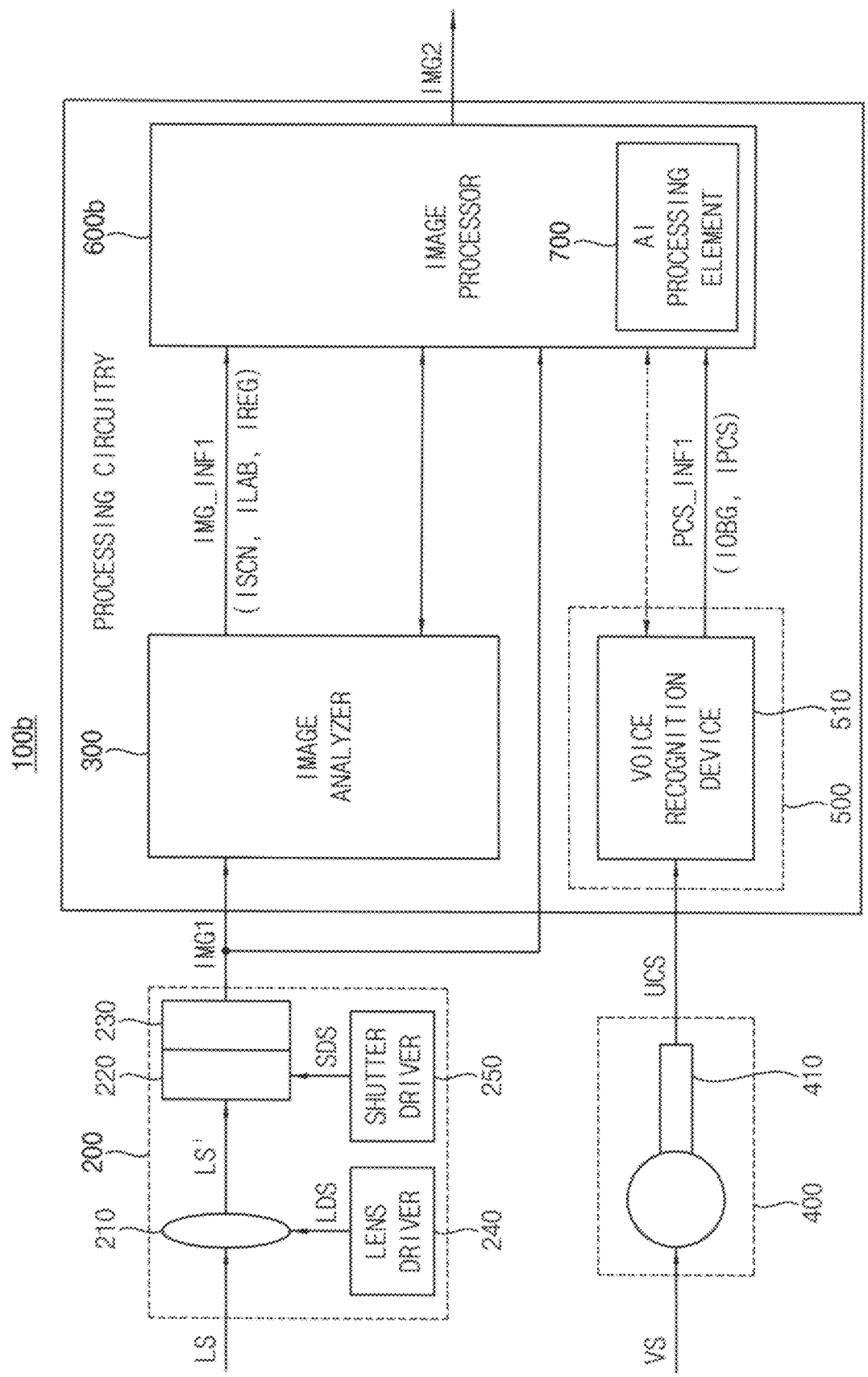
Figure 15:
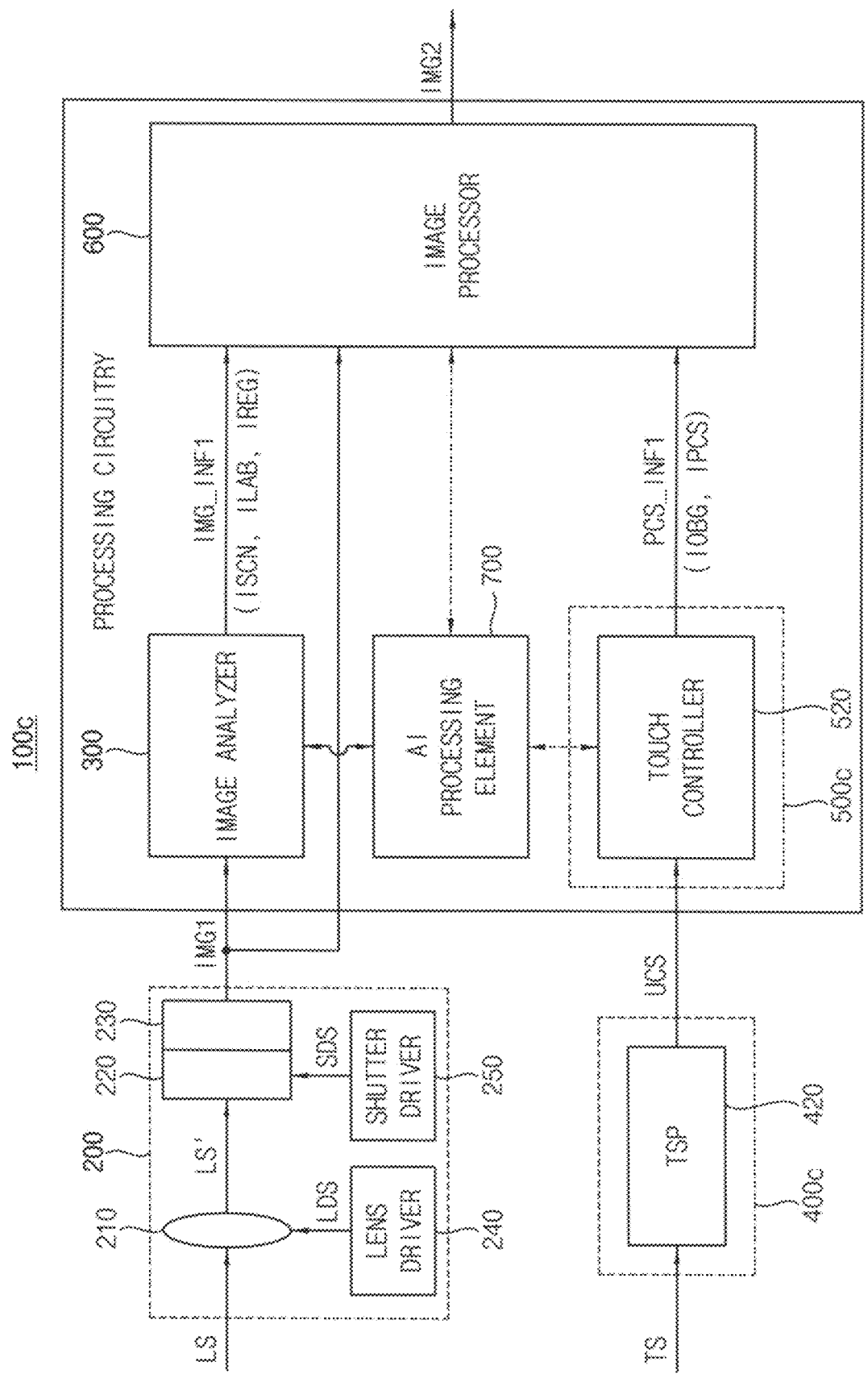

FIGS. 13, 14 and 15 are block diagrams illustrating an image processing device according to some example embodiments. The descriptions repeated with FIG. 2 will be omitted.

Referring to FIG. 13, an image processing device 100a includes an image pickup device 200 and processing circuitry. In some example embodiments, the processing circuitry may include an image analyzer 300a, a command receiver 400, a command analyzer 500 and an image processor 600. The image processing device 100a may further include at least one artificial intelligence processing element 700. It is to be appreciated that some other example embodiments may include a different set of components than that shown in FIG. 13, such as more or fewer components, and/or a different arrangement of the operations performed by the image processing device 100 and the components that are configured to perform such operations. For example, in some example embodiments, one component of the image processing device 100 may perform two or more operations; and in some other example embodiments, one operation may be performed by two or more components. Further, respective components of the processing circuitry may be implemented as a variety of computing technologies, such as hardware, software, or a hardware/software combination.

The image processing device 100a of FIG. 13 may be substantially the same as the image processing device 100 of FIG. 2, except that the artificial intelligence processing element 700 may be included in the processing circuitry, such as the image analyzer 300a. The image pickup device 200, the command receiver 400, the command analyzer 500, the image processor 600 and/or the artificial intelligence processing element 700 in FIG. 13 may be substantially the same as the image pickup device 200, the command receiver 400, the command analyzer 500, the image processor 600 and/or the artificial intelligence processing element 700 in FIG. 2, respectively.

Referring to FIG. 14, an image processing device 100b includes an image pickup device 200 and processing circuitry. In some example embodiments and as shown in FIG. 14, the processing circuitry may include an image analyzer 300, a command receiver 400, a command analyzer 500 and an image processor 600b. The image processing device 100b may further include at least one artificial intelligence processing element 700. It is to be appreciated that some other example embodiments may include a different set of components than that shown in FIG. 14, such as more or fewer components, and/or a different arrangement of the operations performed by the image processing device 100 and the components that perform such operations. For example, in some example embodiments, one component of the image processing device 100 may perform two or more operations; and in some other example embodiments, one operation may be performed by two or more components. Further, respective components of the processing circuitry may be implemented as a variety of computing technologies, such as hardware, software, or a hardware/software combination.

The image processing device 100b of FIG. 14 may be substantially the same as the image processing device 100 of FIG. 2, except that the artificial intelligence processing element 700 is included in the processing circuitry, for example, the image processor 600b. The image pickup device 200, the image analyzer 300, the command receiver 400, the command analyzer 500 and/or the artificial intelligence processing element 700 in FIG. 14 may be substantially the same as the image pickup device 200, the image analyzer 300, the command receiver 400, the command analyzer 500 and/or the artificial intelligence processing element 700 in FIG. 2, respectively.

Referring to FIG. 15, an image processing device 100c includes an image pickup device 200 and processing circuitry. In some example embodiments and as shown in FIG. 15, processing circuitry may include an image analyzer 300, a command receiver 400c, a command analyzer 500c and an image processor 600. The image processing device 100c may further include at least one artificial intelligence processing element 700. It is to be appreciated that some other example embodiments may include a different set of components than that shown in FIG. 13, such as more or fewer components, and/or a different arrangement of the operations performed by the image processing device 100 and the components that perform such operations. For example, in some example embodiments, one component of the image processing device 100 may perform two or more operations; and in some other example embodiments, one operation may be performed by two or more components. Further, respective components of the processing circuitry may be implemented as a variety of computing technologies, such as hardware, software, or a hardware/software combination.

The image processing device 100c of FIG. 15 may be substantially the same as the image processing device 100 of FIG. 2, except that configurations of the command receiver 400c and the command analyzer 500c are changed. The image pickup device 200, the image analyzer 300, the image processor 600 and/or the artificial intelligence processing element 700 in FIG. 15 may be substantially the same as the image pickup device 200, the image analyzer 300, the image processor 600 and/or the artificial intelligence processing element 700 in FIG. 2, respectively.

In an example of FIG. 15, the user command signal UCS may correspond to the touch information (or touch event) from the user. The processing circuitry (for example, a command receiver 400c) may include a touch sensor panel (TSP) 420 that is configured to receive a touch signal (or sensing signal) TS corresponding to the touch information from the user as the user command signal UCS. For example, the touch sensor panel 420 may include a plurality of sensing capacitors, and a capacitance of each sensing capacitor may vary in response to contact or proximity of an object (e.g., a finger of the user). The processing circuitry (for example, a command analyzer 500c) may include a touch controller 520 that is configured to analyze the touch information from the user to obtain the image processing information PCS_INF1. For example, the touch controller 520 may be configured to recognize the contact or proximity of the object based on variation in the capacitance of each sensing capacitor, and/or to output a command to perform a specific and/or appropriate operation (e.g., object selection in an image and/or image processing).

Although not illustrated, in the image processing device 100c including the touch sensor panel 420 and the touch controller 520 illustrated in FIG. 15, an arrangement of the artificial intelligence processing element 700 may be changed as described with reference to FIGS. 13 and 14.

Although some example embodiments have been described with reference to FIGS. 1 through 15 based on the examples where at least one of the voice information of the user and the touch information from the user is received as the user command signal, some example embodiments are not limited thereto, and may be employed or extended to examples where the command receiver and the command analyzer receive and analyze arbitrary trigger information (e.g., motion information, gesture information, etc.) as the user command signal for the convenience of the user.

Figure 16:
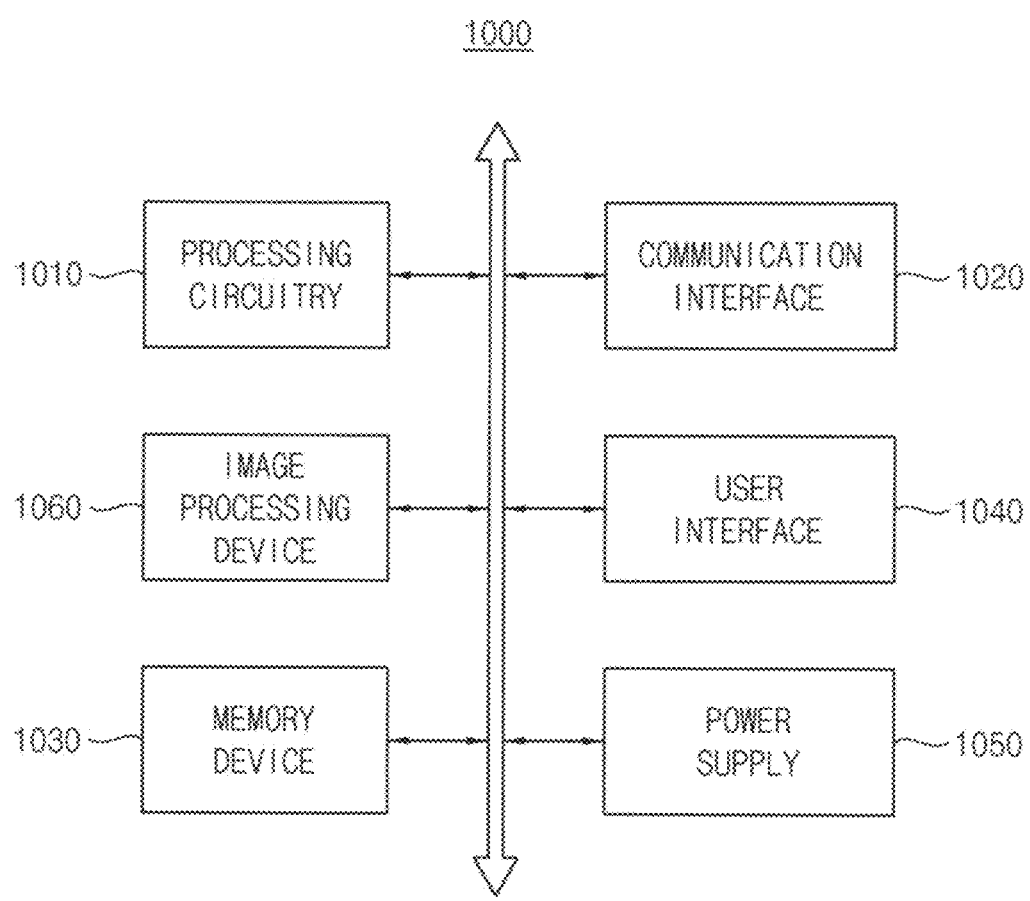
FIG. 16 is a block diagram illustrating an electronic system according to some example embodiments.

FIG. 16 is a block diagram illustrating an electronic system according to some example embodiments.

Referring to FIG. 16, an electronic system 1000 includes processing circuitry 1010, a communication interface 1020, a memory device 1030, a user interface 1040, a power supply 1050 and an image processing device 1060. For example, the electronic system 1000 may be any mobile system or any computing system.

In some example embodiments, the processing circuitry 1010 may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry 1010 may be configured to control overall operations of the electronic system 1000, to execute an operating system (OS) and various applications, and/or to perform various computational functions such as calculations and tasks. The communication interface 1020 may be configured to communicate with an external device. The memory device 1030 may be configured to operate as a data storage for data processed by the processing circuitry 1010 or a working memory. The user interface 1040 may include at least one input device such as a keypad, a button, a microphone, a touch screen, etc., and/or at least one output device such as a speaker, or a display device, etc. The power supply 1050 may be configured to provide power to the electronic system 1000.

The image processing device 1060 may be controlled by the processing circuitry 1010, and may be the image processing device according to some example embodiments. In the image processing device 1060, a current image may be analyzed based on artificial intelligence to obtain image information, a signal that requires minimal user's operation or interaction may be received as a user command, and a desired specific effect may be applied to a specific object included in the current image based on the user command and the obtained image information. Thus, the user may focus on the specific object he or she wants, and may selectively and partially apply an appropriate effect on the specific object. Accordingly, various effects may be efficiently expressed or represented on the current image, and user's desire may be satisfied.

Some example embodiments presented herein may exhibit an example organization of components. Other example embodiments may include a different organization of components, such as renaming, rearranging, adding, partitioning, duplicating, merging, and/or removing components, sets of components, and relationships thereamong, without departing from the scope of the present disclosure. All such variations that are reasonably technically and logically possible, and that are not contradictory with other statements, are intended to be included in this disclosure, the scope of which is to be understood as being limited only by the claims.

In some example embodiments, some inventive concepts discussed herein may be applied to various electronic devices and systems that include the image processing devices and systems. For example, some inventive concepts discussed herein may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of some example embodiments and is not to be construed as limiting thereof. Although some example embodiments have been described, those skilled in the art will readily appreciate that many modifications are possible in some example embodiments without materially departing from the novel teachings and advantages of such example embodiments. Accordingly, all such modifications are intended to be included within the scope of some example embodiments as defined in the claims. Therefore, it is to be understood that the foregoing is illustrative of various example embodiments and is not to be construed as limited to the specific example embodiments disclosed, and that modifications to the disclosed example embodiments, as well as some other example embodiments, are intended to be included within the scope of the appended claims.

What is claimed is:

1. A method of processing an image, the method comprising:
    obtaining, by processing circuitry,
        a first image including a plurality of objects, and
        image information associated with the first image;
    obtaining, by the processing circuitry, image processing information associated with an image operation to be performed on the first image based on a user command indicating the image operation to be performed and indicating a target object, among the plurality of objects in the first image, on which the image operation is to be performed; and
    generating, by the processing circuitry, a second image,
    wherein the generating the second image includes performing the image operation on the target object in the first image based on the image information and the image processing information,
    wherein the obtaining the first image includes performing a first auto focus on at least one object of the plurality of objects to capture the first image,
    wherein the user command is specified in at least one of voice information of a user or touch information of the user,
    wherein the obtaining the image processing information includes:
    recognizing the user command, analyzing the user command to detect first information that is associated with the target object, and
    analyzing the user command to detect second information that is associated with the image operation,
    wherein the generating the second image includes:
    determining whether a first label corresponding to the first information among a plurality of labels for the plurality of objects exists, and
    performing a second auto focus on the second image based on the target object, the determining that the first label exists, and the second information to generate the second image.

2. The method of claim 1, wherein the obtaining the first image and the image information includes:
    analyzing the first image to detect a scene type of the first image;
    analyzing the plurality of objects to:
        detect object types of the plurality of objects, and
        assign the plurality of labels to the plurality of objects; and
    detecting a plurality of object regions in which respective objects of the plurality of objects are located in the first image.

3. The method of claim 2, wherein the performing includes determining a largest object among the plurality of objects based on which the first auto focus is to be performed.

4. The method of claim 2, wherein the first auto focus is based on a center object that is closest to a center of the first image among the plurality of objects.

5. The method of claim 2, wherein the image operation includes the second auto focus.

6. The method of claim 2, wherein the generating the second image includes:
    determining whether the first label corresponding to the first information associated with the target object among the plurality of labels for the plurality of objects exists;
    performing the second auto focus on the second image based on the target object, the determining that the first label exists, and the second information to generate a third image; and
    performing the image operation on the third image based on the target object and the second information to generate the second image.

7. The method of claim 6, wherein the performing the image operation includes performing the image operation only on a first region corresponding to the target object in the third image.

8. The method of claim 6, wherein:
    the image operation includes the second auto focus for the target object, and
    the image operation further includes at least one of a white balance adjustment, a color saturation adjustment, a contrast adjustment and a sharpness adjustment to be applied to a first region corresponding to the target object in at least one of the first image and the third image.

9. The method of claim 6, wherein the processing circuitry is further configured to:
    request an additional user command based on determining that the first label does not exist.

10. The method of claim 6, wherein the processing circuitry is further configured to:
    request an additional user command based on determining that an existence of the first label cannot be confirmed based only on the first information.

11. An image processing device comprising:
    an image pickup device configured to obtain a first image including a plurality of objects; and
    processing circuitry configured to:
        obtain the first image,
        analyze the first image to obtain image information associated with the plurality of objects in the first image, receive a user command indicating an image operation and indicating a target object, among the plurality of objects in the first image, on which the image operation is be performed, analyze the user command to obtain image processing information associated with the image operation to be performed on the target object in the first image, and generate a second image, wherein generating the second image includes performing the image operation on the target object in the first image based on the image information obtained from the first image and the image processing information obtained from the user command, wherein obtaining the first image includes performing a first auto focus on at least one object of the plurality of objects to capture the first image, wherein the user command is specified in at least one of voice information of a user or touch information from the user, wherein obtaining the image processing information includes:
recognizing the user command,
analyzing the user command to detect first information that is associated with the target object, and
analyzing the user command to detect second information that is associated with the image operation, and wherein generating the second image includes:
determining whether a first label corresponding to the first information among a plurality of labels for the plurality of objects exists, and
performing a second auto focus on the second image based on the target object, the determining that the first label exists, and the second information to generate the second image.

12. The image processing device of claim 11, further comprising:
at least one artificial intelligence processing element configured to drive an artificial neural network for analyzing the first image to obtain first image information.

13. The image processing device of claim 12, wherein the at least one artificial intelligence processing element is included in an image analyzer.

14. The image processing device of claim 12, wherein the at least one artificial intelligence processing element is included in the processing circuitry.

15. The image processing device of claim 11, wherein the processing circuitry is further configured to:
receive the voice information of the user as the user command, and
analyze the voice information of the user to obtain the image processing information.

16. The image processing device of claim 11, wherein the processing circuitry is further configured to:
receive the touch information from the user as the user command, and analyze the touch information from the user to obtain the image processing information.

17. The image processing device of claim 11, wherein the image pickup device includes at least one of:
a sensor configured to obtain the first image based on an external light signal;
a lens configured to concentrate the external light signal on the sensor;
a shutter configured to selectively provide the external light signal to the sensor;
a lens driver configured to control a position of the lens; and
a shutter driver configured to control an operation of the shutter.

18. A method of processing an image, the method comprising:
performing, by processing circuitry, a first auto focus on at least one object of a plurality of objects to obtain a first image including the plurality of objects;
analyzing, by the processing circuitry, the first image to obtain image information including a scene type of the first image, a plurality of labels representing object types of the plurality of objects, and a plurality of object regions in which the plurality of objects are located in the first image;
receiving, by the processing circuitry, a user command specified in at least one of voice information of a user and touch information from the user, the user command representing an image operation to be performed on the first image based on a target object among the plurality of objects;
analyzing, by the processing circuitry, the user command to obtain image processing information including first information associated with the target object and second information associated with the image operation;
determining, by the processing circuitry, whether a label corresponding to the first information among the plurality of labels for the plurality of objects exists;
performing, by the processing circuitry, a second auto focus based on the target object, the second information associated with the image operation, and determining that the label exists; and
performing, by the processing circuitry, the image operation on only a first region of the first image that corresponds to the target object based on the second information to obtain a second image.

* * * * *